United States Patent [19]

Campbell

[11] Patent Number: 4,927,293

[45] Date of Patent: May 22, 1990

[54] METHOD AND APPARATUS FOR REMEDIATING CONTAMINATED SOIL

[76] Inventor: Randy P. Campbell, 712 E. Locust, Lompoc, Calif. 93436

[21] Appl. No.: 312,934

[22] Filed: Feb. 21, 1989

[51] Int. Cl.$^5$ ............................................... B09B 3/00
[52] U.S. Cl. .................................. 405/128; 405/303; 404/92
[58] Field of Search .................. 404/75, 76, 90, 91, 404/92, 111; 405/128, 129; 47/DIG. 10

[56] References Cited

U.S. PATENT DOCUMENTS

| | | | |
|---|---|---|---|
| 1,500,437 | 7/1924 | Burton | 404/90 X |
| 3,732,023 | 5/1973 | Rank et al. | 404/111 X |
| 4,027,428 | 6/1977 | Hillel | 404/91 X |
| 4,272,212 | 6/1981 | Bauer, Jr. et al. | 404/91 X |
| 4,655,916 | 4/1987 | Schlesiger | 405/128 X |

Primary Examiner—Jerome W. Massie, IV
Assistant Examiner—Matthew Smith
Attorney, Agent, or Firm—Marvin E. Jacobs

[57] ABSTRACT

A remediating apparatus has a conveyor which moves contaminated material, a main hopper which holds a load of contaminated material and dispenses the material onto the conveyor at a receiving location, and an auxiliary hopper adjacent the main hopper which holds a load of an absorbent material and dispenses the material onto the contaminated material as the material is moved toward a transfer location. The apparatus also has an oxidizing material applicator and an aerator associated with an elongated mixing chamber. Also, a mixing and conveying auger rotatably mounted in the mixing chamber concurrently mixes the contaminated and absorbent material received in the mixing chamber at the transfer location and transports them from the transfer location to a deposit location. Spray nozzles of the applicator connected in communication with the mixing chamber spray pressurized oxidizing material on the mixture of contaminated and absorbent materials. Air nozzles of the aerator connected in communication with the mixing chamber inject air under pressure in the mixture of contaminated, absorbent and oxidizing materials to aerate the materials concurrently as the oxidizing material is sprayed thereon and the contaminated, absorbent and oxidizing materials are being mixed to produce a reaction therebetween and form reaction by-products which are more environmentally acceptable than the contaminated material for discharge at the deposit location.

31 Claims, 4 Drawing Sheets

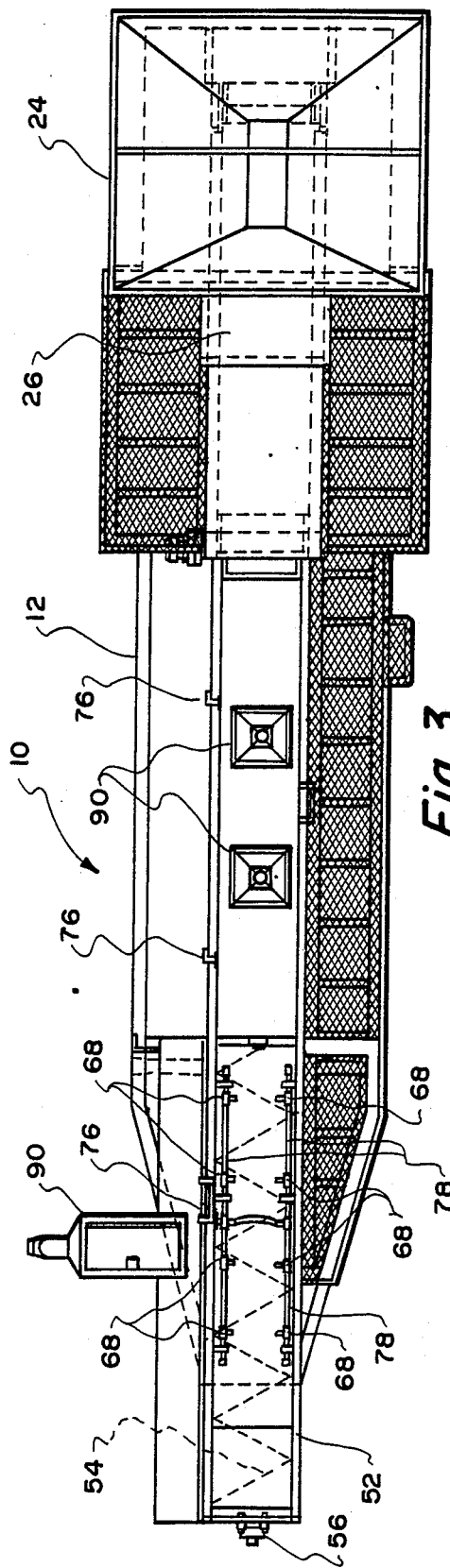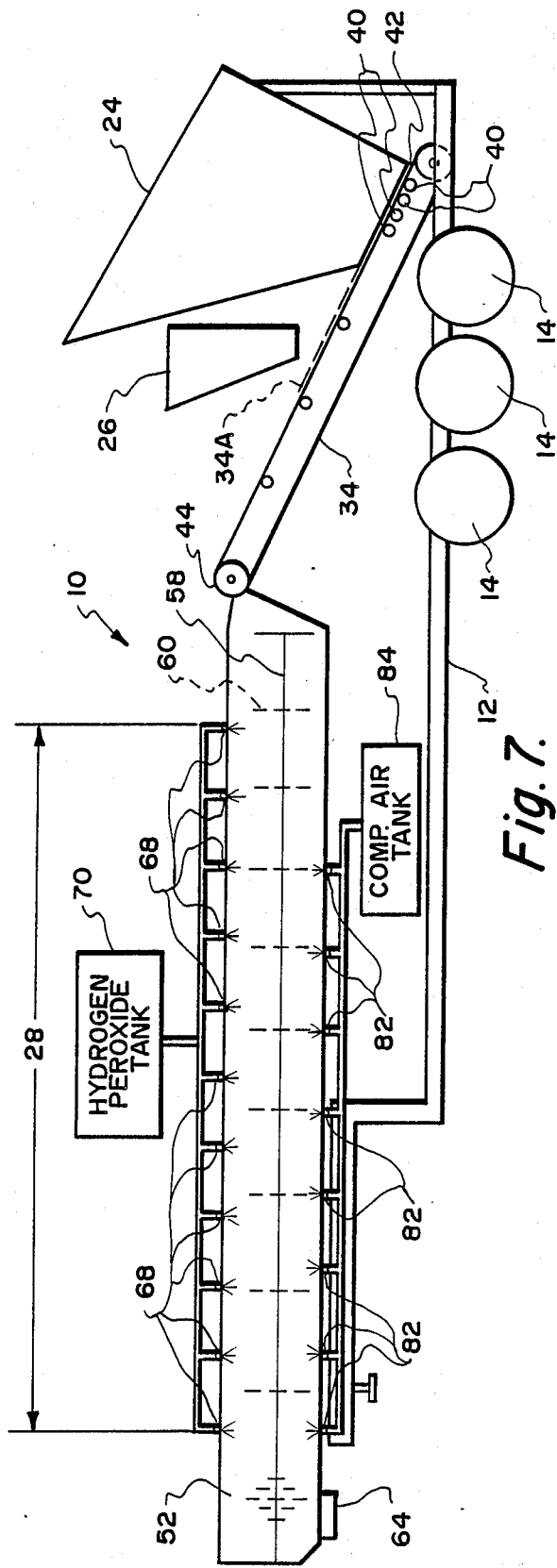

METHOD AND APPARATUS FOR REMEDIATING CONTAMINATED SOIL

BACKGROUND OF THE INVENTION

The present invention relates generally to treatment of contaminated material and, more particularly, is concerned with a method and apparatus for remediating contaminated soil, such as gasoline contaminated earth.

Soil contamination is a frequent by-product of certain types of industrial and business operations. One typical example is a gasoline storage depot or service station having leaking gasoline storage tanks. The contaminated soil at the abandoned site must be remediated to make the land suitable for some other use. The cleanup cost can easily be more than the market value of the real estate.

Heretofore, the cleanup operation has been performed in a very time-consuming and inefficient manner. For example, one cleanup method has been to spread out the contaminated soil with a farm implement and mix it with an absorbent. Then, the mixture of contaminated soil and absorbent is manually sprayed with hydrogen peroxide and the sprayed soil is again mixed using the farm implement. The peroxide and absorbent react with the contaminant in the soil to form more environmentally acceptable reaction by-products.

Mechanization of the cleanup operation is highly desirable to accomplish decontamination in a more systematic and reliable manner and with improved efficiency and possibly lower cost. Machines are known in the prior art for regeneration of asphalt pavement by removing the asphalt from the previously paved road surface and returning the same to the surface from which it was taken after being rejuvenated by pulverizing and mixing it with a binder. Representative of the prior art are the machines disclosed in Bauer, Jr. U.S. Pat. No. (4,272,212) and Chiostri U.S. Pat. No. (4,453,856). However, approaches for mechanization of asphalt regeneration are not perceived as being directly applicable to remediation of contaminated soil.

Consequently, a need exists for a way to mechanize remediation of contaminated soil to improve reliability and efficiency of cleanup operations.

SUMMARY OF THE INVENTION

The present invention provides a contaminated soil remediation method and apparatus designed to satisfy the aforementioned needs. Remediation or treatment of the contaminated soil by the method and apparatus of the present invention decreases the level of contamination such that the soil can be sent to a landfill or can be returned to the excavated site rather than being stored in a hazardous waste storage facility.

Accordingly, the present invention is directed to a method and apparatus for remediating contaminated material, such as environmentally unacceptable soil. The remediating method and apparatus comprise the operative steps of: (a) conveying a contaminated material from a receiving location to a transfer location; (b) dispensing an absorbent material on the contaminated material between the receiving and transfer locations; (c) receiving the contaminated and absorbent materials at the transfer location and concurrently mixing the materials together and transporting them from the transfer location to a deposit location; (d) applying an oxidizing material on the contaminated and absorbent materials between the transfer and deposit locations to produce mixing of the oxidizing material therewith between the transfer and deposit locations; and (e) aerating the contaminated, absorbent and oxidizing materials between the transfer and deposit locations concurrently as the oxidizing material is being applied and the contaminated, absorbent and oxidizing materials are being mixed to produce a reaction therebetween which forms reaction by-products more environmentally acceptable than the contaminated material for discharge at the deposit location.

Also, the remediating method and apparatus comprise the operative step of receiving and holding a load of contaminated material and dispensing the contaminated material in a continuous flow from the load thereof. The conveying of contaminated material is continuous from the receiving to transfer locations. Additionally, the remediating method and apparatus include the operative step of receiving and holding a load of absorbent material and dispensing the absorbent material in a continuous flow from the load thereof. The applying of oxidizing material is by spraying the oxidizing material in liquid form at a first plurality of spaced locations between the transfer and deposit locations on the mixture of contaminated and absorbent materials. The aerating of the materials occurs at a second plurality of spaced locations between the transfer and deposit locations and is by injecting of air under pressure. Further, the remediating method and apparatus comprise the operative step of collecting any volatile reaction by-products to prevent release thereof to ambient atmosphere.

These and other features and advantages of the present invention will become apparent to those skilled in the art upon a reading of the following detailed description when take in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 3 is a top plan view of the apparatus as seen along line 3-3 of FIG. 2.

FIG. 7 is a schematic diagram of a contaminated soil remediating method carried out by the apparatus of FIG. 1.

DETAILED DESCRIPTION OF THE INVENTION

Figure 1:
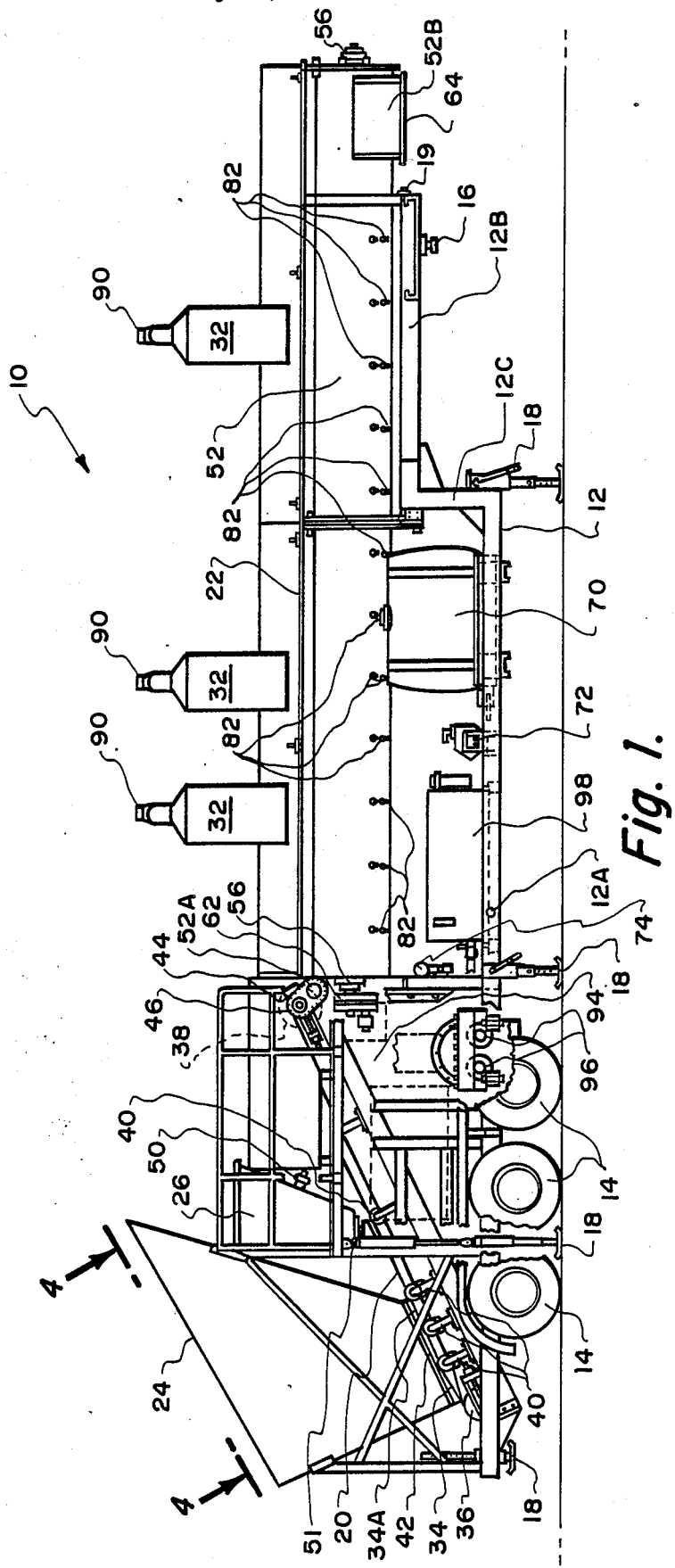
FIG. 1 is a side elevational view of a contaminated soil remediating apparatus in accordance with the present invention.
Figure 2:
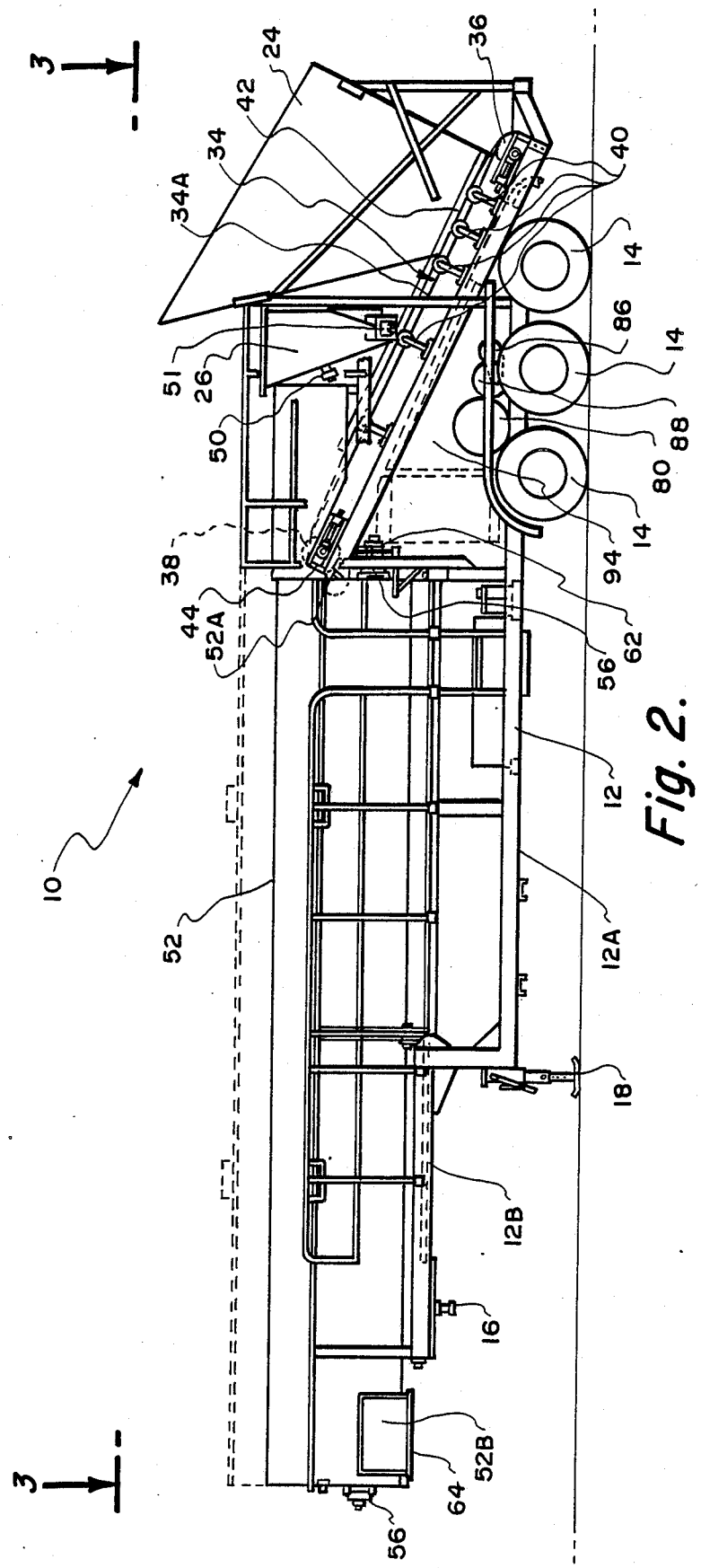
FIG. 2 is another side elevational view of the apparatus from, the side thereof opposite to that of FIG. 1.

Referring now to the drawings, and particularly to FIGS. 1-3, there is shown a mobile remediating apparatus, being indicated generally by the numeral 10 and constructed in accordance with the principles of the present invention. The remediating apparatus 10 is adapted for cleaning up contaminated soil, such as gasoline contaminated earth. However, the apparatus is also useful for remediating other contaminated materials. For reference purposes hereafter, the right side of the apparatus 10 is shown in FIG. 1, and the left side is illustrated in FIG. 2.

The remediating apparatus 10 of the present invention has an elongated mobile support frame 12 formed by a horizontal rear frame portion 12A and a horizontal front frame portion 12B interconnected by a vertical middle frame portion 12C. The rear frame portion 12A is longer than the front frame portion 12B and is located at an elevation below that of the front frame portion 12A, as determined by the height of the middle frame portion 12C, to provide the frame 12 in what is commonly referred to as a gooseneck construction. The frame 12 is made mobile by being supported at the rear end of its rear frame portion 12A on a plurality of tandemly-arranged axle and wheel units 14. The mobile frame 12 has a fifth wheel pin 16 at the front end of its front frame portion 12B for attachment to a suitable towing vehicle (not shown), such as a truck tractor. The vehicle is used to tow the apparatus 10 to and from a work site where cleanup operations are to be performed on contaminated soil. When the remediating apparatus 10 is setup for operation, in addition to the support provided by the axle and wheel units 14, the frame 12 is stationarily supported by several jacks 18 attached to the rear and middle frame portions 12A, 12C, as seen in FIGS. 1 and 2.

In its basic components, the mobile remediating apparatus 10 includes a conveying means 20 and mixing and transporting means 22 mounted in end-to-end relationship on the mobile frame 12. Also included in the apparatus 10 are main and auxiliary hoppers 24 and 2 mounted side-by-side and disposed above the conveying means 20. Further, the apparatus 10 includes an applicator 28, an aerator 30 and a collector 32 associated with the mixing and transporting means 22.

More particularly, the conveying means 20 of the remediating apparatus 10 preferably includes a continuous belt conveyor 34 disposed in inclined relation on the lower rear portion 12A of the mobile frame 12. The belt conveyor 34 is movably mounted about spaced rotatable lower and upper belt idler and drive drums 36 and 38 and over intermediate spaced apart rollers 40. The latter rollers 40 support the upper run 34A of the belt conveyor 34 for supporting and continuously conveying contaminated soil from a receiving location 42 to a transfer location 44 at respective opposite ends of the belt conveyor. Means for driving the conveying means 20 take the form of a gear reduction mechanism and motor 46 mounted on the frame 12 at the front end of the belt conveyor 34 and drivingly coupled to the upper belt drive drum 38.

The main and auxiliary hoppers 24 and 26 of the remediating apparatus 10 are supported by the lower rear portion 12A of the mobile frame 12 above the upper run 34A of the belt conveyor 34. The main hopper 24 disposed rearwardly of the auxiliary hopper 26 is located directly above the receiving location 42 on the belt conveyor 34. The auxiliary hopper 26 disposed adjacent the main hopper is located along the conveyor 34 intermediately between the receiving and transfer locations 42, 44.

Figure 4:
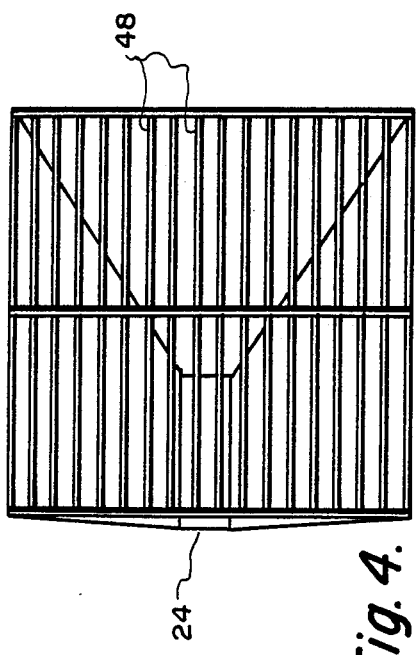
FIG. 4 is a top plan view of a contaminated soil receiving hopper of the apparatus.

The larger main hopper 24 has an open grid 48, as seen in FIG. 4, covering its upper open end and through which contaminated material, such as soil, is loaded in any suitable manner such as by a loader or backhoe (not shown). The main hopper 24 receives and holds the load of contaminated material above the belt conveyor 34. At the same time, through a lower open end of the hopper 24 the contaminated material is dispensed in a continuous flow, forming a layer of the material on the belt conveyor 34 at the receiving location 42 thereof.

The smaller auxiliary hopper 26, preferably of the vibratory type actuated by a vibrator motor 50, receives and holds a load of an absorbent material. The absorbent material is a chemical additive suitable for fostering a reaction serving to substantially decontaminate the soil. An example of a suitable absorbent material is the calcined material disclosed in Saberwal U.S. Pat. Nos. 4,440,867 and 4,530,765 The absorbent material held by the auxiliary hopper 26 is dispensed by an applicator motor 51 through an open bottom of the hopper in a continuous flow onto the contaminated material as the material is conveyed on the belt conveyor 34 under and past the hopper 26 toward the transfer location 44 of the belt conveyor.

The mixing and transporting means 22 of the remediating apparatus 10 includes an elongated mixing chamber 52 mounted horizontally on the frame 12 along the lower rear, upper front and middle vertical frame portions 12A–12C and at the elevation of the upper front frame portion 12B. The mixing chamber 52, preferably in the form of an elongated hollow cylinder, is disposed end-to-end with the belt conveyor 34 for receiving the contaminated and absorbent materials at the transfer location 44 thereof disposed in communication with a rear upper open end portion 52A of the mixing chamber.

The mixing and transporting means 22 also includes a combined mixer and conveyor in the form of an auger-type structure 54 rotatably mounted through the chamber 52 at its opposite ends by end bearings 56. As illustrated schematically in FIG. 7, preferably, the combined mixer and conveyor auger-type structure 54 is composed of a center shaft 58 and a plurality of paddles 60 of different radial lengths and of slight inclinations attached to and radially extending from the center shaft. The auger-type structure 54 is drivingly coupled to and rotatably driven by an auger gear reduction mechanism and motor 62 mounted on the frame adjacent the rear end of the mixing chamber 52. As the auger-type structure 54 rotates in the mixing chamber 52, the materials are concurrently mixed together and transported from the upper rear open end portion 52A at the transfer location 42 of the belt conveyor 34 to a deposit location 64 defined by a bottom front open end portion 52B of the mixing chamber 52 forwardly of the upper front frame portion 12B. From the deposit location 64 the treated or decontaminated material can drop to the ground.

The applicator 28 of the apparatus 10 is operable for applying an oxidizing material, such as hydrogen peroxide, on the contaminated and absorbent materials being mixed and transported in the mixing chamber 52. The applicator 28 includes a supply 66 of the pressurized oxidizing material and a plurality of spray nozzles 68 connected in communication with the supply 66 and with the mixing chamber 52 at a plurality of spaced locations between the transfer and deposit locations 44, 64. The spray nozzles 68 spray the pressurized oxidizing material in liquid form on the mixture of contaminated and absorbent materials to produce mixing of the oxidizing material therewith between the transfer and deposit locations.

More particularly, the oxidizing material supply 66 includes, in flow communication a peroxide tank 70, a peroxide pump 72, and a pressure regulator 74 mounted on the mobile frame 12, and manifold inlets 76 and spray bar manifolds 78 mounted on the mixing chamber 52. The spray bar manifolds 78, in turn, mount the spray nozzles 68. Operation of the pump 72 causes delivery of peroxide liquid from the tank 70 to the spray bar manifolds 78 and thus to the spray nozzles 68 for spraying on the mixture of contaminated and absorbent materials in the mixing chamber 52.

Figure 5:
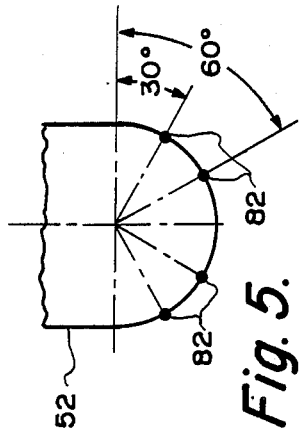
FIG. 5 is an end schematic view of an arrangement of air injection nozzles on a mixing chamber of the apparatus of FIG. 1.

The aerator 30 of the apparatus 10 is operable for injecting air under pressure from the several angularly displaced directions shown in FIG. 5 into the mixture of contaminated, absorbent and oxidizing materials being transported along the mixing chamber 52. The aerator 30 includes a supply 80 of compressed air and a plurality of air nozzles 82, preferably four rows of twelve in a row, connected in communication with the air supply 8 and with the mixing chamber 52 at a plurality of spaced locations between the transfer and deposit locations 44, 64. More particularly, the supply 80 of the aerator 30 includes compressed air supply tank 84, a compressed air drive motor 86, and an air injection compressor 88 mounted on the mobile frame 12. The motor 86 is drivingly coupled to the compressor 88 and upon operation causes compressed air to flow from the tank 84 to the air nozzles 82 for injection into the mixing chamber 52.

In such manner, the contaminated, absorbent and oxidizing materials being transported through the mixing chamber 52 are aerated concurrently as the oxidizing liquid is sprayed thereon and the materials are mixed, producing a reaction therebetween which forms reaction by-products more environmentally acceptable than the contaminated material alone. The solid reaction by-products are thus environmentally acceptable for discharge at the deposit location 64 of the mixing chamber 52.

The collector 32 of the remediating apparatus 10 is provided for collecting any volatile gaseous reaction by-products to prevent release thereof to ambient atmosphere. The collector 32 includes at least one and preferably a plurality of storage canisters 90 connected in communication with the upper portion of the mixing chamber 52 for stripping and receiving the volatile reaction by-products in the upwardly directed air flow. The canisters 90 perform a filtering function, removing the environmentally noxious gases before allowing return of the air to the ambient atmosphere. The canisters 90 can contain a catalytic material or activated carbon for this purpose.

Figure 6:
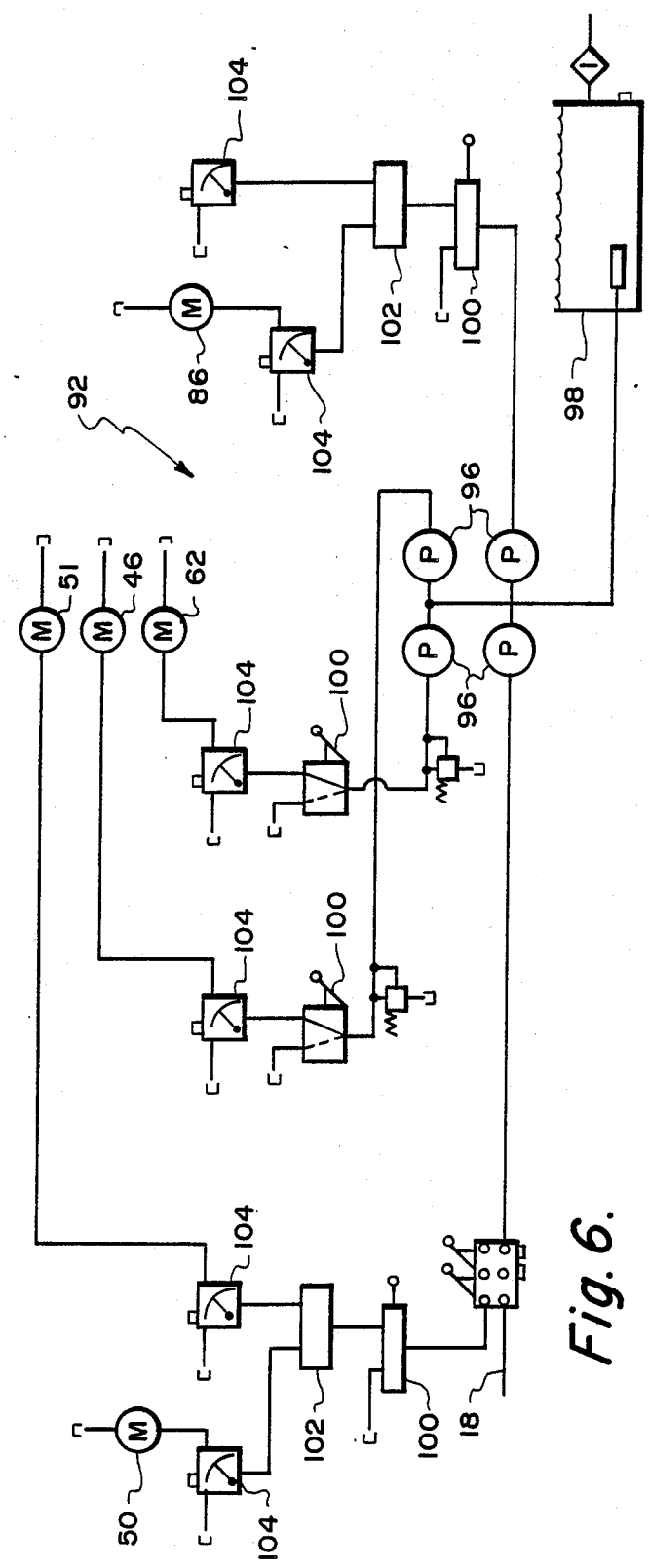
FIG. 6 is a schematic diagram of a hydraulic circuit incorporated by the apparatus of FIG. 1.

In FIG. 6 is illustrated a schematic diagram of a hydraulic circuit 92 of the apparatus 10. The apparatus 10 includes an engine 94 (see FIGS. 1 and 2) which drives a plurality of hydraulic pumps 96 to pump hydraulic fluid under pressure from a reservoir 98 for powering the hydraulic motors 46, 50, 51, 62, 86. Interposed between the hydraulic pumps 96 are a series of valves 100, flow dividers 102 and flow regulators 104.

Referring to FIG. 7, there is illustrated the sequence of steps involved in the contaminated material remediating method performed by the apparatus of FIGS. 1-3. First, at the main hopper 24, a load of contaminated material is received, held and dispensed in a continuous flow onto the belt conveyor 34 at its receiving location 42. Next, the contaminated material in a layer supported on the belt conveyor 34 is continuously conveyed from the receiving location 42 to the transfer location 44. From above the belt conveyor 34 adjacent the main hopper, a load of absorbent material is received, held and dispensed in a continuous flow onto the contaminated material being conveyed between the receiving and transfer locations 42, 44 by the belt conveyor 34. Next, the layered contaminated and absorbent materials arrive at the transfer location 44 and are received into the mixing chamber 52 where they will be concurrently mixed and transported from the transfer location 44 to the final deposit location 64.

Concurrently as the materials are transported through and mixed in the mixing chamber 52 by the auger-type structure 54, the oxidizing liquid, preferably hydrogen peroxide, is sprayed thereon from the spray nozzles 68 at the first plurality of spaced locations between the transfer and deposit locations 44, 64 onto the contaminated and absorbent materials, produce mixing of the oxidizing material therewith between the transfer and deposit locations. Also, concurrently as the materials are transported through the mixing chamber 52, the materials are aerated by injection of compressed air from air nozzles 82 at a second plurality of spaced locations between the transfer and deposit locations 44, 64. A chemical reaction is produced which forms the less environmentally damaging solid by-products which can then be allowed to drop to the ground at the deposit location 64 of the chamber 52. Gaseous by-products are filter from the air by the canisters 90 to prevent their release to the ambient atmosphere with return of the air.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention, what is claimed is:

1. An apparatus for remediating contaminated material, comprising:
   (a) means for conveying a contaminated material from a receiving location to a transfer location;
   (b) means for dispensing an absorbent material on the contaminated material between said receiving and transfer locations;
   (c) means for receiving the contaminated and absorbent materials at said transfer location and for concurrently mixing the materials together and transporting them from said transfer location to a deposit location;
   (d) means for applying an oxidizing material on the contaminated and absorbent materials between said transfer and deposit locations to produce mixing of the oxidizing material therewith between said transfer and deposit locations; and
   (e) means for injecting oxygen containing gas the contaminated, absorbent and oxidizing materials between said transfer and deposit locations concurrently as the oxidizing material is being applied and the contaminated, absorbent and oxidizing materials are being mixed to produce a reaction therebetween which forms reaction by-products more environmentally acceptable than the contaminated material for discharge at said deposit location.

2. The apparatus of claim 1 further comprising:
means for collecting any volatile reaction byproducts to prevent release thereof to ambient atmosphere.

3. The apparatus of claim 2 wherein said transporting and mixing means includes an elongated mixing chamber, a combined mixer and conveyor rotatably mounted therein and means for rotatably driving said combined mixer and conveyor.

4. The apparatus of claim 3 wherein said collecting means is at least one storage cannister connected in communication with said mixing chamber for receiving the volatile reaction by-products.

5. The apparatus of claim 1 further comprising:
means for receiving and holding a load of contaminated material and for dispensing the contaminated material in a continuous flow from the load thereof.

6. The apparatus of claim 5 wherein said contaminated material holding and dispensing means includes a main hopper.

7. The apparatus of claim 1 wherein said conveying means is operable for continuous conveying of the contaminated material from said receiving to transfer locations.

8. The apparatus of claim 7 wherein said conveying means includes a belt conveyor and means for supporting and driving said conveyor.

9. The apparatus of claim 1 further comprising;
means for receiving and holding a load of the absorbent material and for dispensing the absorbent material in a continuous flow from the load thereof.

10. The apparatus of claim 9 wherein said absorbent material holding and dispensing means includes an auxiliary hopper.

11. The apparatus of claim 1 wherein said transporting and mixing means includes an elongated mixing chamber, a combined mixer and conveyor rotatably mounted therein and means for rotatably driving said combined mixer and conveyor.

12. The apparatus of claim 11 wherein said oxidizing material applying means includes a supply of the pressurized oxidizing material and a plurality of spray nozzles connected in communication with said supply and with said mixing chamber at a plurality of spaced locations between said transfer and deposit locations for receiving and spraying the pressurized oxidizing material in liquid form on the mixture of contaminated and absorbent materials.

13. The apparatus of claim wherein said aerating means includes a supply of compressed air and a plurality of air nozzles connected in communication with said air supply and with said mixing chamber at a plurality of spaced locations between said transfer and deposit locations for receiving and injecting air under pressure in the mixture of contaminated, absorbent and oxidizing materials.

14. An apparatus for remediating contaminated material, comprising:
(a) an elongated frame;
(b) means on said frame for continuously conveying contaminated material from a receiving location to a transfer location;
(c) means on said frame for holding a load of contaminated material and dispensing the material in a continuous flow at said receiving location;
(d) means on said frame for holding a load of an absorbent material and dispensing the material in a continuous flow on the contaminated material as the latter material is conveyed between said receiving and transfer locations;
(e) means on said frame for receiving the contaminated and absorbent materials at said transfer location and for concurrently mixing the materials together and transporting them from said transfer location to a deposit location;
(f) means on said frame for spraying an oxidizing material on the contaminated and absorbent materials at a first plurality of spaced locations between said transfer and deposit locations to produce mixing of the oxidizing material with the contaminated and absorbent materials as the latter are mixed together and transported from said transfer to deposit locations; and
(g) means on said frame for injecting oxygen containing gas the contaminated, absorbent and oxidizing materials at a second plurality of spaced locations between said transfer and deposit locations concurrently as the oxidizing material is sprayed thereon and the contaminated, absorbent and oxidizing materials are mixed together and transported from said transfer to deposit locations to produce a reaction therebetween which forms reaction by-products more environmentally acceptable than the contaminated material for discharge at said deposit location.

15. The apparatus of claim 14 further comprising:
means on said frame connected in communication with said mixing and transporting means for collecting any volatile reaction by-products to prevent release thereof to ambient atmosphere.

16. The apparatus of claim 15 wherein said transporting and mixing means includes an elongated mixing chamber, a combined mixing and conveying auger rotatably mounted therein and means for rotatably driving said combined mixer and conveyor.

17. The apparatus of claim 16 wherein said collecting means is at least one storage cannister connected in communication with said mixing chamber for receiving the volatile reaction by-products.

18. The apparatus of claim 14 wherein said contaminated material holding and dispensing means includes a main hopper disposed above said receiving location on said conveying means, and said absorbent material holding and dispensing means includes an auxiliary hopper disposed adjacent said main hopper and above said conveying means between said receiving and transfer locations thereon.

19. The apparatus of claim 14 wherein said conveying means includes a belt conveyor and means for supporting and driving said conveyor.

20. The apparatus of claim 14 wherein said transporting and mixing means includes an elongated mixing chamber, a combined mixing and conveying auger rotatably mounted therein and means for rotatably driving said combined mixer and conveyor.

21. The apparatus of claim 20 wherein said oxidizing material spraying means includes a supply of the pressurized oxidizing material and a plurality of spray nozzles connected in communication with said supply and with said mixing chamber at said first plurality of spaced locations between said transfer and deposit locations for receiving and spraying the pressurized oxidizing material in liquid form on the mixture of contaminated and absorbent materials.

22. The apparatus of claim 20 wherein said aerating means includes a supply of compressed air and a plurality of air nozzles connected in communication with said air supply and with said mixing chamber at said second plurality of spaced locations between said transfer and deposit locations for receiving and injecting air under pressure in the mixture of contaminated, absorbent and oxidizing materials.

23. A method for remediating contaminated material, comprising the steps of:
   (a) conveying a contaminated material from a receiving location to a transfer location;
   (b) dispensing an absorbent material on the contaminated material between the receiving and transfer locations;
   (c) receiving the contaminated and absorbent materials at the transfer location and concurrently mixing the materials together and transporting them from the transfer location to a deposit location;
   (d) applying an oxidizing material on the contaminated and absorbent materials between the transfer and deposit locations to produce mixing of the oxidizing material therewith between the transfer and deposit locations; and
   (e) aerating the contaminated, absorbent and oxidizing materials between the transfer and deposit locations concurrently as the oxidizing material is being applied and the contaminated, absorbent and oxidizing materials are being mixed to produce a reaction therebetween and form reaction by-products which are more environmentally acceptable than the contaminated material for discharge at the deposit location.

24. The method of claim 23 further comprising the step of:
   receiving and holding a load of contaminated material and dispensing the material in a continuous flow from the load thereof at the receiving location 25. The method of claim 23 wherein said conveying of contaminated material is continuous.

26. The method of claim 23 further comprising the step of:
   receiving and holding a load of absorbent material and dispensing the material in a continuous flow from the load thereof between the receiving and transfer locations.

27. The method of claim 23 wherein said applying of oxidizing material is by spraying the oxidizing material in liquid form at a plurality of spaced locations between the transfer and deposit locations on the mixture of contaminated and absorbent materials.

28. The method of claim 23 wherein said aerating of the materials occurs at a plurality of spaced locations between the transfer and deposit locations and is by injecting of air under pressure.

29. The method of claim 23 further comprising the step of:
   collecting any volatile reaction by-products to prevent release thereof to ambient atmosphere.

30. A method for remediating contaminated material, comprising the steps of:
   (a) holding a load of contaminated material and dispensing the material in a continuous flow from the load thereof at the receiving location;
   (b) receiving contaminated material in the continuous flow thereof at the receiving location and conveying the material from the receiving location to a transfer location;
   (c) holding a load of absorbent material and dispensing the material in a continuous flow from the load thereof and onto the contaminated material being conveyed between the receiving and transfer locations;
   (d) receiving the contaminated and absorbent materials at the transfer location and concurrently mixing the materials together and transporting them from the transfer location to a deposit location;
   (e) spraying a liquid oxidizing material at a first plurality of spaced locations between the transfer and deposit locations onto the contaminated and absorbent materials to produce mixing of the oxidizing material therewith between the transfer and deposit locations; and
   (f) aerating the contaminated, absorbent and oxidizing materials at a second plurality of spaced locations between the transfer and deposit locations by injecting air under pressure into the materials concurrently as the oxidizing material is being sprayed and the contaminated, absorbent and oxidizing materials are being mixed the produce a reaction therebetween and form reaction by-products which are more environmentally acceptable than the contaminated material for discharge at the deposit location.

31. The method of claim 30 further comprising the step of:
   collecting any volatile reaction by-products to prevent release thereof to ambient atmosphere.

* * * * *